United States Patent
Yamashita et al.

(10) Patent No.: US 10,818,891 B2
(45) Date of Patent: Oct. 27, 2020

(54) RESIN COMPOSITION FOR SEALANT LAYER OF BATTERY PACKAGING MATERIAL

(71) Applicant: DAI NIPPON PRINTING CO., LTD., Tokyo (JP)

(72) Inventors: Rikiya Yamashita, Tokyo (JP); Hiroki Douke, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 736 days.

(21) Appl. No.: 14/916,076

(22) PCT Filed: Sep. 3, 2014

(86) PCT No.: PCT/JP2014/073189
§ 371 (c)(1),
(2) Date: Mar. 2, 2016

(87) PCT Pub. No.: WO2015/033958
PCT Pub. Date: Mar. 12, 2015

(65) Prior Publication Data
US 2016/0197318 A1    Jul. 7, 2016

(30) Foreign Application Priority Data

Sep. 3, 2013   (JP) ................................ 2013-181741
Sep. 5, 2013   (JP) ................................ 2013-184172

(51) Int. Cl.
*H01M 2/08* (2006.01)
*H01M 2/02* (2006.01)
(Continued)

(52) U.S. Cl.
CPC ............. *H01M 2/08* (2013.01); *B32B 15/085* (2013.01); *C08L 23/14* (2013.01); *C08L 23/16* (2013.01);
(Continued)

(58) Field of Classification Search
CPC . H01M 2/0277; H01M 2/0285; H01M 2/0287
See application file for complete search history.

(56) References Cited

U.S. PATENT DOCUMENTS 4,547,552 A * 10/1985 Toyota .................. C08F 297/08
525/247
5,468,781 A * 11/1995 Sugano ...................... C08J 9/18
521/56
(Continued)

FOREIGN PATENT DOCUMENTS

EP     1889873 A1    2/2008
EP     2629348 A1    8/2013
(Continued)

OTHER PUBLICATIONS

Edward P. Moore Jr., "Polypropylene Handbook" Tokyo Shoko Research Ltd., Jul. 20, 2001, pp. 20.
(Continued)

*Primary Examiner* — Stephan J Essex
(74) *Attorney, Agent, or Firm* — Oliff PLC

(57) ABSTRACT

A resin composition can impart high insulating properties, sealing properties, and moldability to a battery packaging material. A resin composition minimizes cracks when used in the sealant layer of a battery packaging material and a heat seal section of the material is bent, and can impart high insulating properties. A resin composition for use in the sealant layer of a battery packaging material contains: at least one of a propylene-ethylene random copolymer having a melting point of 156° C. or more and an ethylene content of 5 mass % or less and a propylene-ethylene block copolymer having a melting point of 158° C. or more and an ethylene content of 7 mass % or less; and a polyolefin elastomer having a melting point of 135° C. or more. A resin composition for the sealing layer of a battery packaging
(Continued)

material contains a polyolefin resin having an isotactic fraction of 99% or less.

11 Claims, 1 Drawing Sheet

(51) Int. Cl.
    *C09J 123/12*     (2006.01)
    *C09J 123/16*     (2006.01)
    *C09J 153/00*     (2006.01)
    *B32B 15/085*     (2006.01)
    *C08L 23/14*     (2006.01)
    *C08L 23/16*     (2006.01)
    *C08L 23/20*     (2006.01)
    *C09K 3/10*     (2006.01)

(52) U.S. Cl.
    CPC ............. *C08L 23/20* (2013.01); *C09J 123/12* (2013.01); *C09J 123/16* (2013.01); *C09J 153/00* (2013.01); *H01M 2/0277* (2013.01); *H01M 2/0285* (2013.01); *H01M 2/0287* (2013.01); *B32B 2307/31* (2013.01); *B32B 2553/00* (2013.01); *C09K 3/1006* (2013.01); *H01M 2/0275* (2013.01)

(56) References Cited

U.S. PATENT DOCUMENTS

| | | |
|---|---|---|
| 2003/0069320 A1 | 4/2003 | Minami et al. |
| 2005/0113517 A1 | 5/2005 | Tayano et al. |
| 2006/0159943 A1* | 7/2006 | Brant ................. B32B 7/02 428/515 |
| 2011/0165416 A1* | 7/2011 | Kawabe ............... C08F 210/14 428/343 |
| 2011/0294007 A1 | 12/2011 | Hosaka et al. |
| 2013/0029140 A1* | 1/2013 | Takao ..................... H01G 9/08 428/336 |
| 2013/0143107 A1 | 6/2013 | Kuramoto |

FOREIGN PATENT DOCUMENTS

| | | | |
|---|---|---|---|
| JP | 2002-216713 A | | 8/2002 |
| JP | 2002-216714 A | | 8/2002 |
| JP | 2002-220503 A | | 8/2002 |
| JP | 2002-234124 A | | 8/2002 |
| JP | 2002-348316 A | | 12/2002 |
| JP | 2003-073426 A | | 3/2003 |
| JP | 2003073426 A | * | 3/2003 |
| JP | 2003-272571 A | | 9/2003 |
| JP | 2005-103955 A | | 4/2005 |
| JP | 2007-105893 A | | 4/2007 |
| JP | 2007-273398 A | | 10/2007 |
| JP | 2008-287971 A | | 11/2008 |
| JP | 2009-176647 A | | 8/2009 |
| JP | 2012-124068 A | | 6/2012 |
| JP | 2013-101778 A | | 5/2013 |
| WO | 2010/100979 A1 | | 9/2010 |

OTHER PUBLICATIONS

Jan. 19, 2016 Office Action issued in Japanese Patent Application No. 2015-118680.
Dec. 9, 2014 International Search Report issued in International Patent Application No. PCT/JP2014/073189.
Dec. 23, 2016 Search Report issued in European Patent Application No. 14843116.6.
May 24, 2016 Office Action issued in Japanese Patent Application No. 2015-118680.
Dec. 5, 2017 Office Action issued in Japanese Patent Application No. 2017-000024.

* cited by examiner

RESIN COMPOSITION FOR SEALANT LAYER OF BATTERY PACKAGING MATERIAL

TECHNICAL FIELD

A first aspect of the present invention relates to a resin composition which, when used in a sealant layer of a battery packaging material, is capable of imparting high insulation quality, sealing property and moldability to the battery packaging material. A second aspect of the present invention relates to a resin composition which, when used in a sealant layer of a battery packaging material, is capable of imparting high insulation quality to the battery packaging material.

BACKGROUND ART

Various types of batteries have been developed heretofore, and in every battery, a packaging material is an essential member for sealing battery elements such as an electrode and an electrolyte. Metallic packaging materials have often been used heretofore as battery packaging materials, but in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material layer, an adhesive layer, a metal layer and a sealant layer laminated in this order as a battery packaging material which is easily processed into diversified shapes and is capable of achieving thickness reduction and weight reduction (see, for example, Patent Document 1). The film-shaped battery packaging material is formed in such a manner that a battery element can be sealed by heat-welding the peripheral edge by heat sealing with the sealant layers facing each other.

For example, Patent Document 1 discloses a packaging material for a battery casing, including a biaxially-stretched polyamide film layer as an outer layer, a thermoplastic resin unstretched film layer as an inner layer, and an aluminum foil layer disposed between these films.

In such a battery packaging material, polypropylene etc. has been generally used heretofore as a resin that forms a sealant layer in consideration of electrolytic solution resistance, sealing strength and so on. Polypropylene has a melting point of 120° C. or higher, and therefore has the advantage that high sealing strength is exhibited even if a battery packaging material is exposed to a high temperature.

Polypropylene has a crystalline part and a noncrystalline part, and the melting point decreases as the content of the noncrystalline part increases, while the melting point increases as the content of the crystalline part increases. For example, when polypropylene having a high noncrystalline part content is used in a sealant layer, there is the problem that thermal melting starts at, for example, about 80° C., and thus sealing strength becomes insufficient if the temperature of a battery increases. On the other hand, when polypropylene having a high crystalline part content is used in a sealant layer, the melting point increases, and therefore sealing strength at a high temperature is increased, but control of crystallinity (e.g., control of growth of crystal nuclei, an increase in the number of crystal nuclei, and so on) in the cooling process after heat-sealing is difficult. Accordingly, there is the problem that for example when the sealed part is bended after heat-sealing, cracks are generated at the sealed part or a part in the vicinity thereof in the sealant layer, so that insulation quality is easily deteriorated.

For solving such problems, for example, a cooling step of pressing a cooling plate or spraying cooling air to the sealed part may be carried out after heat-sealing is performed with polypropylene used in a sealant layer, the polypropylene having a high crystalline part content and hence a high melting point. However, even when the above-mentioned cooling step is carried out, it is not easy to suppress generation of cracks at the sealed part. Further, since a battery packaging material is required to have not only insulation quality but also high sealing property and moldability, a resin that forms a sealant layer is required to impart these properties.

In recent years, a further thin battery packaging material has been desired as the battery has been required to have a reduced thickness and weight. Thus, the sealant layer has been required to have a further reduced thickness. However, when the thickness of the sealant layer decreases, the insulation quality of the battery packaging material is easily deteriorated. Particularly, at the time of sealing a battery element with a battery packaging material in a process for production of a battery, the battery packaging material may be heat-sealed, and then molded with the heat-sealed part bent inward. In this case, there is the problem that particularly insulation quality is easily deteriorated due to, for example, generation of cracks at the heat-sealed part or a part in the vicinity thereof in the sealant layer.

PRIOR ART DOCUMENT

Patent Document

Patent Document 1: Japanese Patent Laid-open Publication No. 2008-287971

SUMMARY OF THE INVENTION

Problems to be Solved by the Invention

Under these circumstances, a main object of the first aspect of the present invention is to provide a resin composition which, when used in a sealant layer of a battery packaging material, is capable of imparting high insulation quality, sealing property and moldability to the battery packaging material by suppressing generation of cracks when the sealed part of the heat-sealed battery packaging material is bent, exhibiting high sealing strength even if the sealed part is exposed to a high temperature or an electrolytic solution, and suppressing generation of cracks when the battery packaging material is stretched, for example, during molding of the battery packaging material. Further, an object of the first aspect of the present invention is to provide a battery packaging material including the resin composition in a sealant layer.

A main object of the second aspect of the present invention is to provide a resin composition which, when used in a sealant layer of a battery packaging material, is capable of imparting high insulation quality to the battery packaging material by suppressing generation of cracks when the heat-sealed part of the battery packaging material is bent. Further, an object of the second aspect of the present invention is to provide a battery packaging material including the resin composition in a sealant layer.

Means for Solving the Problems

The present inventors have extensively conducted studies for achieving the object of the first aspect of the present invention, and resultantly found that when a resin composition including: at least one of (A-1) a propylene-ethylene random copolymer having a melting point of 156° C. or higher and an ethylene content of 5% by mass or less and (A-2) a propylene-ethylene block copolymer having a melting point of 158° C. or higher and an ethylene content of 7% by mass or less; and (B) a polyolefin-based elastomer having a melting point of 135° C. or higher is used in a sealant layer of a battery packaging material, the resin composition is capable of imparting high insulation quality by suppressing generation of cracks when the sealed part of the heat-sealed battery packaging material is bent, capable of imparting high sealing property by exhibiting high sealing strength even if the sealed part is exposed to a high temperature or an electrolytic solution, and capable of imparting high moldability by suppressing generation of cracks when the battery packaging material is stretched. The first aspect of the present invention has been completed by further conducting studies based on the above-mentioned findings.

The present inventors have extensively conducted studies for achieving the object of the second aspect of the present invention, and resultantly found that when a resin composition including a polyolefin-based resin having an isotactic fraction (mm) of 99% or less is used in a sealant layer of a battery packaging material, the resin composition is capable of imparting high insulation quality to the battery packaging material by suppressing generation of cracks when the heat-sealed part of the battery packaging material is bent. The second aspect of the present invention has been completed by further conducting studies based on the above-mentioned findings.

That is, the present invention provides inventions of the following aspects.

Item 1. A resin composition for a sealant layer of a battery packaging material, including:

at least one of (A-1) a propylene-ethylene random copolymer having a melting point of 156° C. or higher and an ethylene content of 5% by mass or less and (A-2) a propylene-ethylene block copolymer having a melting point of 158° C. or higher and an ethylene content of 7% by mass or less; and (B) a polyolefin-based elastomer having a melting point of 135° C. or higher.

Item 2. The resin composition according to item 1, wherein a content of the (B) polyolefin-based elastomer having a melting point of 135° C. or higher is 20 to 75% by mass.

Item 3. The resin composition according to item 1 or 2, wherein a total content of the (A-1) propylene-ethylene random copolymer having a melting point of 156° C. or higher and an ethylene content of 5% by mass or less and the (A-2) propylene-ethylene block copolymer having a melting point of 158° C. or higher and an ethylene content of 7% by mass or less is 25 to 80% by mass.

Item 4. The resin composition according to any one of items 1 to 3, further including (C) a low-stereoregular olefin having a weight average molecular weight of 10,000 or more, a mesopentad fraction (mmmm) of 90% or less and a melting point of 70° C. or higher.

Item 5. The resin composition according to item 4, wherein the (C) low-stereoregular olefin includes a 1-butene-based polymer.

Item 6. The resin composition according to item 4 or 5, wherein the content of the (B) polyolefin-based elastomer having a melting point of 135° C. or higher is 20 to 65% by mass, and a content of the (C) low-stereoregular olefin having a weight average molecular weight of 10,000 or more, a mesopentad fraction (mmmm) of 90% or less and a melting point of 70° C. or higher is 2 to 30% by mass.

Item 7. A resin composition for a sealant layer of a battery packaging material, including a polyolefin-based resin having an isotactic fraction (mm) of 99% or less.

Item 8. The resin composition according to item 7, wherein the polyolefin-based resin has an ethylene unit content of 0.1 to 10 mol %.

Item 9. The resin composition according to item 7 or 8, wherein in the polyolefin-based resin, an amount of components soluble in n-decane at 80° C. is 0.1 to 15% by mass.

Item 10. The resin composition according to any one of items 7 to 9, wherein the polyolefin-based resin includes at least propylene as a constituent monomer.

Item 11. A battery packaging material including a laminate in which at least a base material layer, a metal layer and a sealant layer are laminated in this order, wherein the sealant layer includes a layer formed of the resin composition according to any one of items 1 to 10.

Item 12. The battery packaging material according to item 11, wherein the layer formed of the resin composition has a thickness of 1 to 20 μm.

Item 13. The battery packaging material according to item 11 or 12, wherein the sealant layer has a thickness of 40 μm or less.

Item 14. A battery, wherein a battery element including a positive electrode, a negative electrode and an electrolyte is sealed in the battery packaging material according to any one of items 11 to 13.

Advantages of the Invention

A resin composition of the first aspect of the present invention, when used in a sealant layer of a battery packaging material, is capable of imparting high insulation quality, sealing property and moldability to the battery packaging material by suppressing generation of cracks when the sealed part of the heat-sealed battery packaging material is bent, further exhibiting high sealing strength even if the sealed part is exposed to a high temperature or an electrolytic solution, and suppressing generation of cracks when the battery packaging material is stretched.

According to the second aspect of the present invention, there can be provided a resin composition which, when used in a sealant layer of a battery packaging material, is capable of imparting high insulation quality to the battery packaging material by suppressing generation of cracks when the heat-sealed part of the battery packaging material is bent. According to the present invention, there can be provided a battery packaging material including the resin composition in a sealant layer, and a battery.

EMBODIMENTS OF THE INVENTION

Figure 1:
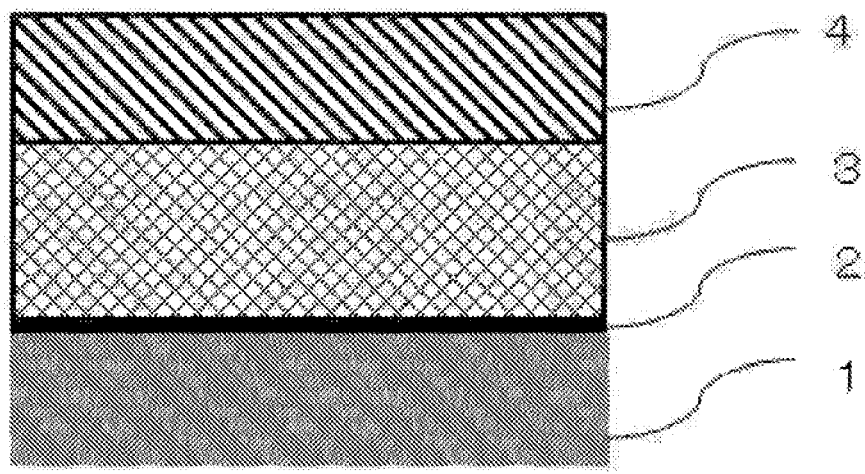
FIG. 1 is a schematic sectional view of a battery packaging material according to the first and second aspects of the present invention.

A resin composition of a first aspect of the present invention includes at least one of (A-1) a propylene-ethylene random copolymer having a melting point of 156° C. or higher and an ethylene content of 5% by mass or less and (A-2) a propylene-ethylene block copolymer having a melting point of 158° C. or higher and an ethylene content of 7% by mass or less; and (B) a polyolefin-based elastomer having a melting point of 135° C. or higher.

A resin composition of a second aspect of the present invention includes a polyolefin-based resin having an isotactic fraction (mm) of 99% or less.

Hereinafter, the resin compositions of the first and second aspects of the present invention, battery packaging materials including the resin compositions in sealant layers, and a battery will be each described in detail.

1. Resin Composition of First Aspect of Invention

The resin composition of the first aspect of the present invention is a resin composition which is used in a sealant layer of, for example, a battery packaging material as described later, and the resin composition including: at least one of (A-1) a propylene-ethylene random copolymer having a melting point of 156° C. or higher and an ethylene content of 5% by mass or less and (A-2) a propylene-ethylene block copolymer having a melting point of 158° C. or higher and an ethylene content of 7% by mass or less; and (B) a polyolefin-based elastomer having a melting point of 135° C. or higher.

The (A-1) propylene-ethylene random copolymer having a melting point of 156° C. or higher and an ethylene content of 5% by mass or less (hereinafter, sometimes referred to simply as "(A-1) random copolymer") is not particularly limited as long as it has a melting point of 156° C. or higher, and an ethylene content of 5% by mass or less based on the amount of the (A-1) random copolymer, and is produced by randomly polymerizing propylene and ethylene that are constituent monomers. The melting point of the (A-1) random copolymer can be adjusted by the molecular weight, the proportion of the crystalline part, the ratio of propylene and ethylene, and so on.

As the (A-1) random copolymer, a commercial product may be used. The upper limit of the melting point of the (A-1) random copolymer is not particularly limited as long as the effect of the first aspect of the present invention is exhibited, but it is preferably 165° C., more preferably 163° C. The lower limit of the ethylene content in the (A-1) random copolymer is not particularly limited as long as the effect of the first aspect of the present invention is exhibited, but it is preferably 2% by mass. The melting point of each component contained in the resin composition of the first aspect of the present invention is a value obtained by performing measurement using a differential scanning calorimeter (DSC).

The content of the (A-1) random copolymer in the resin composition of the first aspect of the present invention is not particularly limited as long as the effect of the first aspect of the present invention is exhibited, but it is preferably about 25 to 80% by mass, more preferably about 30 to 70% by mass, further preferably about 33 to 65% by mass.

The (A-2) propylene-ethylene block copolymer having a melting point of 158° C. or higher and an ethylene content of 7% by mass or less (hereinafter, sometimes referred to simply as "(A-2) block copolymer") is not particularly limited as long as it has a melting point of 158° C. or higher, and an ethylene content of 7% by mass or less based on the amount of the (A-2) block copolymer, and is produced by block-polymerizing propylene and ethylene that are constituent monomers. The melting point of the (A-2) block copolymer can be adjusted by the molecular weight, the proportion of the crystalline part, the ratio of propylene and ethylene, and so on. As the (A-2) block copolymer, a commercial product may be used. The upper limit of the melting point of the (A-2) block copolymer is not particularly limited as long as the effect of the first aspect of the present invention is exhibited, but it is preferably 165° C., more preferably 163° C. The lower limit of the ethylene content in the (A-2) block copolymer is not particularly limited as long as the effect of the first aspect of the present invention is exhibited, but it is preferably 2% by mass.

The content of the (A-2) block copolymer in the resin composition of the first aspect of the present invention is not particularly limited as long as the effect of the first aspect of the present invention is exhibited, but it is preferably about 25 to 80% by mass, more preferably about 30 to 70% by mass, further preferably about 33 to 65% by mass.

The total content of the (A-1) random copolymer and the (A-2) block copolymer in the resin composition of the first aspect of the present invention is preferably about 25 to 80% by mass, more preferably about 30 to 70% by mass, further preferably about 33 to 65% by mass.

The (B) polyolefin-based elastomer having a melting point of 135° C. or higher (hereinafter, sometimes referred to simply as "(B) polyolefin-based elastomer") is not particularly limited as long as it has a melting point of 135° C. or higher and properties as an elastomer (i.e., it is a polyolefin-based elastomer). The (B) polyolefin-based elastomer is preferably a propylene-based elastomer for improvement of sealing strength, prevention of interlayer delamination after heat-sealing, and so on. Examples of the propylene-based elastomer include polymers containing, as constituent monomers, propylene and one or more α-olefins with a carbon number of 2 to 20 (excluding propylene), and specific examples of the α-olefin with a carbon number of 2 to 20 (excluding propylene), which forms the propylene-based elastomer, include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. The (B) polyolefin-based elastomers may be used alone, or may be used in combination of two or more thereof. In the resin composition of the first aspect of the present invention, the (B) polyolefin-based elastomer having a specific melting point is added to at least one of the (A-1) random copolymer and the (A-2) block copolymer, each of which is a propylene-ethylene copolymer having a specific melting point and ethylene content, and thus the flexibility of the resin composition is improved, so that the resin composition, when used in a sealant layer of a battery packaging material, is capable of imparting high insulation quality even when the sealed part of the heat-sealed battery packaging material is bent. As a result of adding the (B) polyolefin-based elastomer, high sealing strength is exhibited even if the sealed part of the battery packaging material is exposed to a high temperature or an electrolytic solution, so that excellent sealing property can be imparted, and further, generation of cracks when the battery packaging material is stretched is suppressed, so that excellent moldability can be imparted.

The melting point of the (B) polyolefin-based elastomer can be adjusted by the molecular weight, the proportion of the crystalline part, the ratio of propylene and ethylene, and so on. As the (B) polyolefin-based elastomer, a commercial product may be used. The upper limit of the melting point of the (B) polyolefin-based elastomer is not particularly limited as long as the effect of the first aspect of the present invention is exhibited, but it is preferably 165° C., more preferably 163° C.

The content of the (B) polyolefin-based elastomer in the resin composition of the first aspect of the present invention is not particularly limited as long as the effect of the first aspect of the present invention is exhibited, but it is preferably about 20 to 75% by mass, more preferably about 25 to 70% by mass, further preferably about 30 to 65% by mass.

Preferably, the resin composition of the first aspect of the present invention further contains (C) a low-stereoregular olefin having a weight average molecular weight of 10,000 or more, a mesopentad fraction (mmmm) of 90% or less and a melting point of 70° C. or higher (hereinafter, sometimes referred to simply as "(C) low-stereoregular olefin") in addition to at least one of the (A-1) random copolymer and the (A-2) block copolymer and the (B) polyolefin-based elastomer. When the resin composition of the first aspect of the present invention contains the (C) low-stereoregular olefin, high flexibility can be imparted to the resin composition without substantially lowering the melting point of the resin composition. Accordingly, when the resin composition of the first aspect of the present invention is used in the sealant layer of the battery packaging material, the tensile yield strength (MD+TD) of the battery packaging material described later can be reduced, and therefore the effect of uniformizing the pressure applied during heat-sealing is enhanced, so that sealing can be made uniform, resulting in achievement of high sealing property. Further, in cooling of resin which occurs after heat-sealing, an effect of suppressing growth of crystal nuclei and an increase in the number of crystal nuclei in the resin composition is exhibited, so that an increase in the number of crystal nuclei after sealing and generation of fine cracks due to ununiformization can be prevented. Accordingly, sealing strength can be increased, and the permeability of an electrolytic solution as a content can be suppressed, so that stable sealing property is achieved.

The (C) low-stereoregular olefin is not particularly limited as long as it has a weight average molecular weight of 10,000 or more, a mesopentad fraction (mmmm) of 90% or less and a melting point of 70° C. or higher, and the effect of the first aspect of the present invention is exhibited. A known low-stereoregular olefin and a commercial product thereof, which satisfy these physical properties, may be used. As the (C) low-stereoregular olefin, for example, a polyolefin-based resin composition as disclosed in Japanese Patent Laid-open Publication No. 2002-220503 may be used. The weight average molecular weight of the (C) low-stereoregular olefin is preferably 30,000 or more. The mesopentad fraction (mmmm) is preferably 80% or less. The melting point is preferably 75° C. or higher. The upper limit of the weight average molecular weight of the (C) low-stereoregular olefin is not particularly limited as long as the effect of the first aspect of the present invention is exhibited, but it is, for example, about 1,000,000, preferably about 500,000. The lower limit of the mesopentad fraction (mmmm) is not particularly limited as long as the effect of the first aspect of the present invention is exhibited, but it is, for example, 20%, preferably 35%. The upper limit of the melting point is not particularly limited as long as the effect of the first aspect of the present invention is exhibited, but it is, for example, 140° C., preferably 100° C. In the first aspect of the present invention, the weight average molecular weight is a value obtained by performing measurement by gel permeation chromatography (GPC) using polystyrene as a standard sample. In the first aspect of the present invention, the mesopentad fraction (mmmm) is a value determined in accordance with the method proposed in "Polymer Journal, 16, 717 (1984)", "Macromol. Chem. Phys., C29, 201 (1989)" and "Macromol. Chem. Phys., 198, 1257 (1997)". Specifically, the mesopentad fraction is determined by measuring signals from a methylene group and a methine group using a $^{13}$C nuclear magnetic resonance spectrum.

Preferably, the (C) low-stereoregular olefin includes a 1-butene-based polymer for satisfying the above-mentioned physical properties of the (C) low-stereoregular olefin. The 1-butene-based polymer may be a homopolymer of 1-butene, or a copolymer of 1-butene and an olefin such as at least one of ethylene and an α-olefin with a carbon number of 3 to 20 (other than 1-butene). The 1-butene-based polymers may be used alone, or may be used in combination of two or more thereof. The weight average molecular weight of the 1-butene-based polymer is preferably 10,000 or more. The mesopentad fraction (mmmm) of the 1-butene-based polymer is preferably 90% or less, more preferably 85% or less. The melting point of the 1-butene-based polymer is preferably 140° C. or lower, more preferably 100° C. or lower. The upper limit of the weight average molecular weight of the 1-butene-based polymer is preferably about 1,000,000, more preferably about 500,000. The lower limit of the mesopentad fraction (mmmm) is preferably 20%, more preferably 40%. The molecular weight distribution (Mw/Mn) of the 1-butene-based polymer is preferably 4 or less, more preferably 3.5 to 1.5, further preferably 3.0 to 1.5.

The (C) low-stereoregular olefin may be composed only of a 1-butene-based polymer, or may be a mixture of a 1-butene-based polymer and a polyolefin. The polyolefin is not particularly limited as long as it can satisfy the above-mentioned physical properties of the (C) low-stereoregular olefin, and examples thereof include polyethylene, polypropylene, poly-α-olefins composed of an α-olefin with a carbon number of 4 or more, polyvinyl cycloalkanes, syndiotactic polystyrene and polyalkenylsilanes. Examples of the polypropylene include homopolypropylene that is a polymer of only propylene, for example random polypropylene of propylene-ethylene and block polypropylene of propylene/propylene-ethylene, and examples of polyethylene include high-density polyethylene, low-density polyethylene, and linear low and high-density polyethylene of, for example, ethylene-butene-1, ethylene-hexene-1 and ethylene-octene-1. Examples of the poly-α-olefin include poly-butene-1, poly(4-methylpentene-1), poly(3-methylpentene-1) and poly(3-methylbutene-1). The polyvinyl cycloalkane is, preferably, polyvinyl cyclohexane, polyvinyl cyclopentane, or the like. Examples of the polyalkenylsilane include those having an alkenyl group with a carbon number of 2 to 20, specifically vinylsilanes, butenesilanes and allylsilanes. Among them, polypropylene, polyethylene and poly-α-olefins are preferred from the viewpoint of compatibility, and polypropylene is further preferred from the viewpoint of heat resistance and flexibility. The weight average molecular weight of the polyolefin is preferably 10,000 or more. The polyolefins may be used alone, or may be used in combination of two or more thereof.

When the (C) low-stereoregular olefin contains a 1-butene-based polymer and a polyolefin, the mass ratio of the 1-butene-based polymer to the polyolefin in the (C) low-stereoregular olefin is not particularly limited, but it is preferably about 1:99 to 99:1, more preferably about 10:90 to 90:10, further preferably about 10:90 to 60:40.

When the resin composition of the first aspect of the present invention contains the (C) low-stereoregular olefin, the content of the (C) low-stereoregular olefin is not particularly limited as long as the effect of the first aspect of the present invention is exhibited, but it is preferably about 2 to 30% by mass, more preferably about 3 to 25% by mass, further preferably about 5 to 20% by mass. When the resin composition of the first aspect of the present invention contains the (C) low-stereoregular olefin, the content of the (B) polyolefin-based elastomer in the resin composition of the first aspect of the present invention is preferably about 20 to 65% by mass, more preferably about 25 to 60% by mass, further preferably about 20 to 50% by mass.

The melt flow rate (MFR) of the resin composition of the first aspect of the present invention at 230° C. is not particularly limited, but it is preferably 1 to 20 g/10 minutes, more preferably 2.5 to 15 g/10 minutes. In the first aspect of the present invention, the melt flow rate is a value obtained by performing measurement using a melt flow measurement device in accordance with JIS K7210.

The resin composition of the first aspect of the present invention may contain resin components other than the above-mentioned (A-1) random copolymer, the (A-2) block copolymer, the (B) polyolefin-based elastomer and the (C) low-stereoregular olefin as long as the effect of the first aspect of the present invention is not hindered. Examples of these resin components include those that fail to satisfy at least one physical property in the above-mentioned (A-1) random copolymer, (A-2) block copolymer, (B) polyolefin-based elastomer and (C) low-stereoregular olefin. Examples of the resin component that fails to satisfy a physical property value in the (A-1) random copolymer include random copolymers of propylene-ethylene having a melting point of 156° C. or higher and an ethylene content of more than 5% by mass, random copolymers of propylene-ethylene having a melting point of lower than 156° C. and an ethylene content of 5% by mass or less, and random copolymers of propylene-ethylene having a melting point of lower than 156° C. and an ethylene content of more than 5% by mass; examples of the resin component that fails to satisfy a physical property value in the (A-2) block copolymer include block copolymers of propylene-ethylene having a melting point of 158° C. or higher and an ethylene content of more than 7% by mass, block copolymers of propylene-ethylene having a melting point of lower than 158° C. and an ethylene content of 7% by mass or less, and block copolymers of propylene-ethylene having a melting point of lower than 158° C. and an ethylene content of more than 7% by mass; examples of the resin component that fails to satisfy a physical property value in the (B) polyolefin-based elastomer include polyolefin-based elastomers having a melting point of lower than 135° C.; and examples of the resin component that fail to satisfy a physical property value in the (C) low-stereoregular olefin include olefins having a weight average molecular weight of less than 10,000, a mesopentad fraction (mmmm) of 90% or less and a melting point of 70° C. or higher, olefins having a weight average molecular weight of 10,000 or more, a mesopentad fraction (mmmm) of more than 90% and a melting point of 70° C. or higher, olefins having a weight average molecular weight of 10,000 or more, a mesopentad fraction (mmmm) of 90% or less and a melting point of lower than 70° C., olefins having a weight average molecular weight of less than 10,000, a mesopentad fraction (mmmm) of more than 90% and a melting point of 70° C. or higher, olefins having a weight average molecular weight of 10,000 or more, a mesopentad fraction (mmmm) of more than 90% and a melting point of lower than 70° C., olefins having a weight average molecular weight of less than 10,000, a mesopentad fraction (mmmm) of 90% or less and a melting point of lower than 70° C., and olefins having a weight average molecular weight of less than 10,000, a mesopentad fraction (mmmm) of more than 90% and a melting point of lower than 70° C. When the resin composition of the first aspect of the present invention contains resin components other than the (A-1) random copolymer, the (A-2) block copolymer, the (B) polyolefin-based elastomer and the (C) low-stereoregular olefin, the total content of these resin components in the resin composition of the first aspect of the present invention is preferably 30% by mass or less, more preferably 25% by mass or less.

The resin composition of the first aspect of the present invention can be suitably used as a resin composition that forms a sealant layer of a battery packaging material. Hereinafter, the configurations of a battery packaging material to be produced using the resin composition of the first aspect of the present invention, and a battery will be described in detail.

2. Battery Packaging Material of First Aspect of Invention

Figure 2:
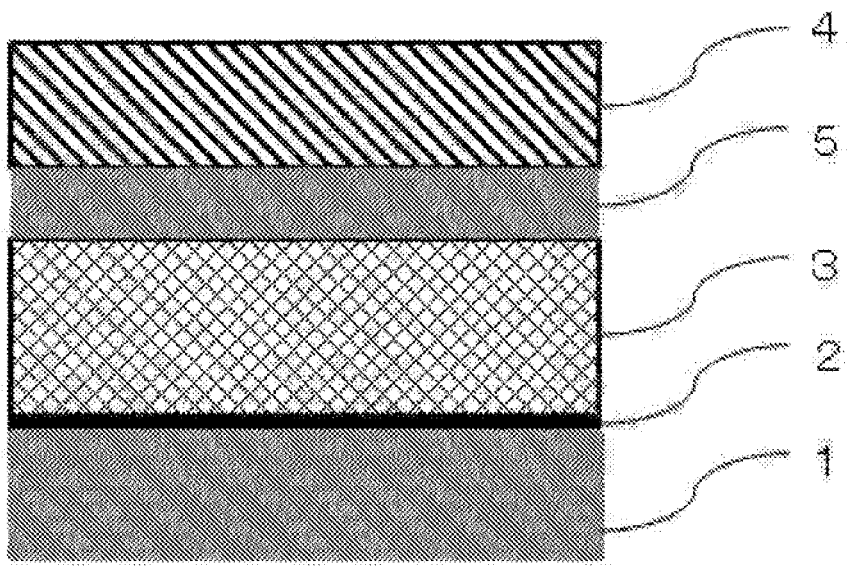
FIG. 2 is a schematic sectional view of a battery packaging material according to the first and second aspects of the present invention.

The battery packaging material includes a laminate including at least a base material layer 1, a metal layer 3 and a sealant layer 4 in this order. As shown in FIG. 1, the battery packaging material may include an adhesive layer 2 between the base material layer 1 and the metal layer 3. When the battery packaging material of the first aspect of the present invention is used in a battery, the base material layer 1 serves as an outermost layer, and the sealant layer 4 serves as an innermost layer (battery element side). During construction of a battery, the sealant layers 4 situated on the peripheral edge of a battery element are brought into contact with each other, and heat-welded to hermetically seal the battery element, so that the battery element is encapsulated. As shown in FIG. 2, the battery packaging material may include an adhesive layer 5 between the metal layer 3 and the sealant layer 4.

3. Compositions of Layers that Forms Battery Packaging Material of First Aspect of Invention

[Base Material Layer 1]

In the battery packaging material of the first aspect of the present invention, the base material layer 1 is a layer that forms the outermost layer. The material that forms the base material layer 1 is not particularly limited as long as it has insulation quality. Examples of the material that forms the base material layer 1 include polyesters, polyamides, epoxies, acrylics, fluororesins, polyurethanes, silicone resins, phenols, polyether imides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester with ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyldicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); alicyclic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the metal layer 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins.

The friction of the base material layer 1 may be reduced for improving moldability. When the friction of the base material layer 1 is reduced, the friction coefficient of the surface thereof is not particularly limited, and it is, for example, 1.0 or less. Examples of the method for reducing the friction of the base material layer 1 include matting treatment, formation of a thin film layer of a slipping agent, and a combination thereof.

Examples of method of matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The thin film layer of a slipping agent can be formed by precipitating a slipping agent on the surface of the base material layer 1 by bleeding-out to form a thin layer, or depositing a slipping agent on the base material layer 1. The slipping agent is not particularly limited, and examples thereof include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These slipping agents may be used alone, or may be used in combination of two or more thereof.

The thickness of the base material layer 1 is, for example, 10 to 50 μm, preferably 15 to 30 μm.

[Adhesive Layer 2]

In the battery packaging material of the first aspect of the present invention, the adhesive layer 2 is a layer provided as necessary for bonding the base material layer 1 and the metal layer 3.

The adhesive layer 2 is formed from an adhesive capable of bonding the base material layer 1 and the metal layer 3. The adhesive used for forming the adhesive layer 2 may be a two-liquid curable adhesive resin, or may be a one-liquid curable adhesive resin. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the resin component of the adhesive that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive components may be used alone, or may be used in combination of two or more thereof. The combination form of two or more adhesive components is not particularly limited, and examples of the adhesive components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesives; and polyamides, polyesters or blend resins of these resins and modified polyolefins are preferred because they are excellent in spreadability, durability and transformation inhibition action under high-humidity conditions, thermal degradation inhibition action during heat-sealing, and so on, and effectively suppress occurrence of delamination by inhibiting a reduction in lamination strength between the base material layer 1 and the metal layer 3.

The adhesive layer 2 may be made multilayered with different adhesive components. When the adhesive layer 2 is made multilayered with different components, it is preferred that a resin excellent in adhesion with the base material layer 1 is selected as an adhesive component to be disposed on the base material layer 1 side, and an adhesive component excellent in adhesion with the metal layer 3 is selected as an adhesive component to be disposed on the metal layer 3 side for improving the lamination strength between the base material layer 1 and the metal layer 3. When the adhesive layer 2 is made multilayered with different adhesive components, specific examples of the preferred adhesive component to be disposed on the metal layer 3 side include acid-modified polyolefins, metal-modified polyolefins, mixed resins of polyesters and acid-modified polyolefins, and resins containing copolymerization polyester.

The thickness of the adhesive layer 2 is, for example, 2 to 50 μm, preferably 3 to 25 μm.

[Metal Layer 3]

In the battery packaging material of the first aspect of the present invention, the metal layer 3 is a layer which is intended to improve the strength of the packaging material, and also functions as a barrier layer for preventing ingress of water vapor, oxygen, light and the like into the battery. Specific examples of the metal that forms the metal layer 3 include metal foils such as those of aluminum, stainless steel and titanium. Among them, aluminum is suitably used. For preventing occurrence of creases and pinholes during production of the packaging material, it is preferred to use soft aluminum, for example annealed aluminum (JIS A8021P-O) or (JIS A8079P-O), for the metal layer 3 in the first aspect of the present invention.

The thickness of metal layer 3 is, for example, 10 to 200 μm, preferably 20 to 100 μm.

Preferably, at least one surface, preferably the sealant layer 4-side surface, further preferably both surfaces, of the metal layer 3 is/are subjected to a chemical conversion treatment for stabilization of bonding, prevention of dissolution and corrosion, and so on. Here, the chemical conversion treatment is a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4).

[Chemical Formula 1]

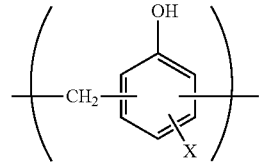
(1)

[Chemical Formula 2]

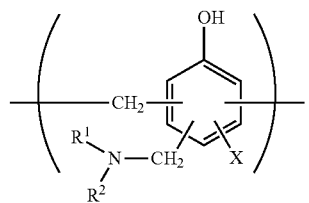
(2)

[Chemical Formula 3]

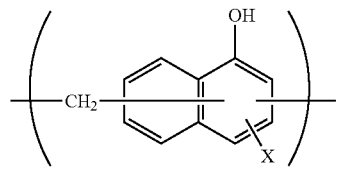
(3)

-continued

[Chemical Formula 4]

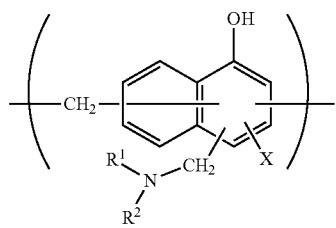

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistance film to be formed on the surface of the metal layer 3 in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 to about 50 mg, preferably about 1.0 to about 40 mg, in terms of chromium, the phosphorus compound be contained in an amount of about 0.5 to about 50 mg, preferably about 1.0 to about 40 mg, in terms of phosphorus, and the aminated phenol polymer be contained in an amount of about 1 to about 200 mg, preferably about 5.0 to 150 mg, per 1 $m^2$ of the surface of the metal layer 3.

The chemical conversion treatment is performed in the following manner: a solution containing a compound to be used for formation of an acid resistance film is applied to the surface of the metal layer 3 by a bar coating method, a roll coating method, a gravure coating method, an immersion method or the like, and heating is then performed so that the temperature of the metal layer 3 is about 70 to 200° C. The metal layer 3 may be subjected to a degreasing treatment by an alkali immersion method, an electrolytic cleaning method, an acid cleaning method, an electrolytic acid cleaning method or the like before the metal layer 3 is subjected to the chemical conversion treatment. When a degreasing treatment is performed as described above, the chemical conversion treatment of the surface of the metal layer 3 can be further efficiently performed.

[Sealant Layer 4]

In the battery packaging material of the first aspect of the present invention, the sealant layer 4 corresponds to the innermost layer, and during construction of a battery, the sealant layers 4 are heat-welded to each other to hermetically seal the battery element. In the first aspect of the present invention, the sealant layer 4 includes a layer formed of the resin composition of the first aspect of the present invention. The sealant layer 4 may be composed of one layer formed of the resin composition of the first aspect of the present invention, or may be composed of a plurality of layers formed of the resin composition. The sealant layer 4 may include one or more other layers in addition to the layer(s) formed of the resin composition of the first aspect of the present invention. The resin that forms the other layer is not particularly limited as long as the effect of the first aspect of the present invention is exhibited, and examples thereof include polyolefins, cyclic polyolefins, carboxylic acid-modified polyolefins and carboxylic acid-modified cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene, and cyclic dienes such as cyclopentadiene, dicyclopentadiene, cyclohexadiene and norbornadiene. Among these polyolefins, cyclic alkenes are preferred, and norbornene is further preferred.

The carboxylic acid modified polyolefin is a polymer obtained by modifying a polyolefin with a carboxylic acid. Examples of the carboxylic acid to be used for modification include maleic acid, acrylic acid, itaconic acid, crotonic acid, maleic anhydride and itaconic anhydride.

The carboxylic acid modified cyclic polyolefin is a polymer obtained by copolymerization while part of monomers constituting the cyclic polyolefin is replaced by α,β-unsaturated carboxylic acid or acid anhydride thereof, or by block copolymerization or graft copolymerization of α,β-unsaturated carboxylic acid or acid anhydride thereof with the cyclic polyolefin. The cyclic polyolefin to be modified with a carboxylic acid may be the same as the above-mentioned cyclic polyolefin. The carboxylic acid to be used for modification may be the same as that used for modification of the acid-modified cycloolefin copolymer.

Among these resin components, crystalline or noncrystalline polyolefins, cyclic polyolefins, and blend polymers thereof are preferred, and polyethylene, polypropylene, copolymer of ethylene and norbornene, and blend polymer of two or more of these are more preferred.

The other layer may be formed from only one resin component, or may be formed from a blend polymer obtained by combining two or more resin components.

The thickness of the sealant layer 4 is not particularly limited, and for example, it may be about 2 μm to 2000 μm, preferably about 5 μm to 1000 μm, more preferably 10 μm to 500 μm.

[Adhesive Layer 5]

In the battery packaging material of the first aspect of the present invention, an adhesive layer 5 may be further provided between the metal layer 3 and the sealant layer 4 as shown in FIG. 2 for the purpose of, for example, firmly bonding the metal layer 3 and the sealant layer 4. The adhesive layer 5 may be formed of one layer, or may be formed of a plurality of layers.

The adhesive layer 5 is formed from a resin capable of bonding the metal layer 3 and the sealant layer 4. The resin that forms the adhesive layer 5 is not particularly limited as long as it is capable of bonding the metal layer 3 and the sealant layer 4, and examples of the preferred resin include the above-mentioned acid-modified polyolefin, polyester resins, fluorine-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins. The resins that form the adhesive layer 5 may be used alone, or may be used in combination of two or more thereof.

The acid-modified polyolefin is a polymer with the polyolefin modified by, for example, subjecting the polyolefin to graft polymerization with an unsaturated carboxylic acid. Specific examples of the polyolefin to be acid-modified include polyethylenes such as low-density polyethylene, medium-density polyethylene, high-density polyethylene and linear low-density polyethylene; crystalline or noncrystalline polypropylenes such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyolefins having at least propylene as a constituent monomer are preferred, and terpolymers of ethylene-butene-propylene and random copolymers of propylene-ethylene are further preferred from the viewpoint of heat resistance. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These acid-modified polyolefins may be used alone, or may be used in combination of two or more thereof.

Examples of the polyester resin include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester with ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyldicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyester resins may be used alone, or may be used in combination of two or more thereof.

Examples of the fluorine-based resin include tetrafluoroethylene, trifluoroethylene, polyvinylidene fluoride, polyvinyl fluoride, ethylene tetrafluoroethylene, polychlorotrifluoroethylene, ethylene chlorotrifluoroethylene copolymers, tetrafluoroethylene-hexafluoropropylene copolymers and fluorine-based polyols. These fluorine-based resins may be used alone, or may be used in combination of two or more thereof.

The adhesive layer 5 may be formed of only at least one of these resins, or may contain a resin component other than these resins as necessary. When a resin component other than these resins is included in the adhesive layer 5, the content of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber and silicone-based resin in the sealant layer 4 is, for example, 10 to 95% by mass, preferably 30 to 90% by mass, further preferably 50 to 80% by mass while it is not particularly limited as long as the effect of the first aspect of the present invention is not hindered.

Preferably, the adhesive layer 5 further contains a curing agent. When the adhesive layer 5 contains a curing agent, the mechanical strength of the adhesive layer 5 is increased, so that the insulation quality of the battery packaging material can be effectively improved. The curing agents may be used alone, or may be used in combination of two or more thereof.

The curing agent is not particularly limited as long as it cures an acid-modified polyolefin, a polyester resin, a fluorine-based resin, a polyether-based resin, a polyurethane-based resin, an epoxy-based resin, a phenol resin-based resin, a polyamide-based resin, a polyolefin-based resin, a polyvinyl acetate-based resin, a cellulose-based resin, a (meth)acryl-based resin, a polyimide-based resin, an amino resin, a rubber or a silicone-based resin. Examples of the curing agent include polyfunctional isocyanate compounds, carbodiimide compounds, epoxy compounds and oxazoline compounds.

The polyfunctional isocyanate compound is not particularly limited as long as it is a compound having two or more isocyanate groups. Specific examples of the polyfunctional isocyanate compound include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers.

The carbodiimide compound is not particularly limited as long as it is a compound having at least one carbodiimide group (—N═C═N—). The carbodiimide compound is preferably a polycarbodiimide compound having at least two carbodiimide groups. Specific examples of the particularly preferred carbodiimide compound include polycarbodiimide compounds having a repeating unit represented by the following general formula (5):

[Chemical Formula 5]

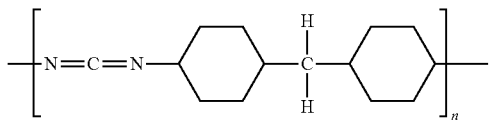

(5)

[in the general formula (5), n is an integer of 2 or larger];
polycarbodiimide compounds having a repeating unit represented by the following general formula (6):

[Chemical Formula 6]

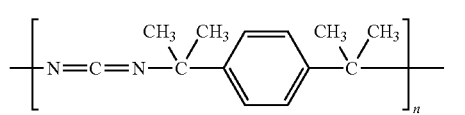

(6)

[in the general formula (6), n is an integer of 2 or larger]; and polycarbodiimide compounds represented by the following general formula (7):

[Chemical Formula 7]

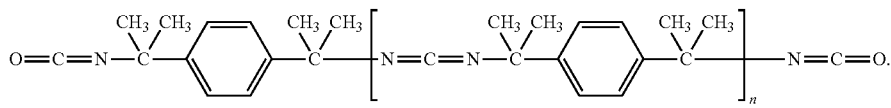

(7)

[in the general formula (7), n is an integer of 2 or larger].

In the general formulae (4) to (7), n is normally an integer of 30 or smaller, preferably an integer of 3 to 20.

The epoxy compound is not particularly limited as long as it is a compound having at least one epoxy group. Examples of the epoxy compound include epoxy resins such as bisphenol A diglycidyl ether, modified bisphenol A diglycidyl ether, novolak glycidyl ether, glycerin polyglycidyl ether and polyglycerin polyglycidyl ether.

The oxazoline compound is not particularly limited as long as it is a compound having an oxazoline backbone. Specific examples of the oxazoline compound include EPOCROS Series from Nippon Shokubai Co., Ltd.

The curing agent may be formed of two or more compounds for increasing the mechanical strength of the adhesive layer 5, etc.

In the adhesive layer 5, the content of the curing agent is preferably in a range of 0.1 parts by mass to 50 parts by mass, more preferably in a range of 0.1 parts by mass to 30 parts by mass based on 100 parts by mass of the acid-modified polyolefin, polyester resin, fluorine-based resin, polyether-based resin, polyurethane-based resin, epoxy-based resin, phenol resin-based resin, polyamide-based resin, polyolefin-based resin, polyvinyl acetate-based resin, cellulose-based resin, (meth)acryl-based resin, polyimide-based resin, amino resin, rubber or silicon-based resin. In the adhesive layer 5, the content of the curing agent is preferably in a range of 1 equivalent to 30 equivalents, more preferably in a range of 1 equivalent to 20 equivalents in terms of a reactive group in the curing agent based on 1 equivalent of carboxyl groups in the resins such as an acid-modified polyolefin resin. Accordingly, the insulation quality and durability of the battery packaging material can be improved.

When the adhesive layer 5 contains a curing agent, the adhesive layer 5 may be formed of a two-liquid curable adhesive resin, or may be formed of a one-liquid curable adhesive resin. Further, the adhesion mechanism of the adhesive is not particularly limited, and may be any one of a chemical reaction type, a solvent volatilization type, a heat melting type, a heat pressing type, an electron beam curing type such as that of UV or EB, and so on.

The thickness of the adhesive layer 5 is not particularly limited, but is preferably 0.01 μm or more, more preferably 0.05 to 20 μm. When the thickness of the adhesive layer 5 is less than 0.01 μm, it may be difficult to stably bond the metal layer 3 and the sealant layer 4 to each other.

4. Method for Producing Battery Packaging Material of First Aspect of Invention

While the method for producing the battery packaging material of the first aspect of the present invention is not particularly limited as long as a laminate including layers each having predetermined composition is obtained, and for example, the following method is shown as an example.

First, a laminate in which the base material layer 1, the adhesive layer 2 and the metal layer 3 are laminated in this order (hereinafter, the laminate may be described as a "laminate A") is formed. Specifically, the laminate A is formed by laminating the base material layer 1 and the metal layer 3 with the surface subjected to a chemical conversion treatment as necessary by a thermal lamination method, a sand lamination method, a combination thereof or the like using an adhesive that forms the adhesive layer 2.

For example, formation of the laminate A by a thermal lamination method can be performed in the following manner: a multilayer film in which the base material layer 1 and the adhesive layer 2 are laminated is provided beforehand, the metal layer 3 is superimposed on the adhesive layer 2, and thermal press-bonding is performed using a heating roll while the adhesive layer 2 is held between the base material layer 1 and the metal layer 3. Formation of the laminate A by a thermal lamination method may also be performed in the following manner: a multilayer film in which the metal layer 3 and the adhesive layer 2 are laminated is provided beforehand, the base material layer 1 is superimposed on the heated metal layer 3 and adhesive layer 2, and thermal press-bonding is performed while the adhesive layer 2 is held between the base material layer 1 and the metal layer 3. The base material layer 1 and the metal layer 3 may be directly laminated without interposing the adhesive layer 2 therebetween.

The multilayer film which is provided beforehand in the thermal lamination method and in which the base material layer 1 and the adhesive layer 2 are laminated is formed in the following manner: an adhesive that forms the adhesive layer 2 is laminated by melt extrusion or solution coating (liquid coating) on a resin film that forms the base material layer 1, and dried, and baking is then performed at a temperature equal to or higher than the melting point of the adhesive that forms the adhesive layer 2. By performing baking, adhesive strength between the metal layer 3 and the adhesive layer 2 is increased. The multilayer film which is provided beforehand in the thermal lamination method and in which the metal layer 3 and the adhesive layer 2 are laminated is similarly formed in the following manner: an adhesive that forms the adhesive layer 2 is laminated by melt extrusion or solution coating on a metal foil that forms the metal layer 3, and dried, and baking is then performed at a temperature equal to or higher than the melting point of the adhesive that forms the adhesive layer 2.

For example, formation of the laminate A by a sand lamination method can be performed in the following manner: an adhesive that forms the adhesive layer 2 is melt-extruded onto the upper surface of the metal layer 3, so that a resin film that forms the base material layer 1 is bonded to the metal layer. Here, it is desirable that the resin film be bonded to perform temporary bonding, and then heated again to perform main bonding. In the sand lamination method, the adhesive layer 2 may be made multilayered with different types of resins. In this case, the laminate should be formed in the following manner: a multilayer film in which the base material layer 1 and the adhesive layer 2 are laminated is provided beforehand, and an adhesive that forms the adhesive layer 2 is melt-extruded onto the upper surface of the metal layer 3, and laminated to the multilayer resin film by a thermal lamination method. Accordingly, the adhesive layer 2 that forms the multilayer film and the adhesive layer 2 laminated on the upper surface of the metal layer 3 are bonded together to form the two-layer adhesive layer 2. When the adhesive layer 2 is made multilayered with different types of resins, the laminate may be formed in the following manner: a multilayer film in which the metal layer 3 and the adhesive layer 2 are laminated is provided before-hand, an adhesive that forms the adhesive layer 2 is melt-extruded onto the base material layer 1, and this is laminated to the adhesive layer 2 on the metal layer 3. Accordingly, the adhesive layer 2 formed of two different adhesives is formed between the multilayer resin film and the base material layer 1.

Then, the sealant layer 4 is laminated on the metal layer 3 of the laminate A. The sealant layer 4 can be laminated on the metal layer 3 of the laminate A by a co-extrusion method, a thermal lamination method, a sand lamination method, a coating method, a combination thereof or the like. For example, when the adhesive layer 5 is not provided, the sealant layer 4 can be formed on the metal layer 3 using a melt extrusion method, a thermal lamination method, a coating method or the like. When the adhesive layer 5 is provided, the adhesive layer 5 can be formed on the metal layer 3 using a melt extrusion method, a thermal lamination method, a coating method or the like, followed by formation of the sealant layer 4 by a similar method. A co-extrusion method may be carried out in which the adhesive layer 5 and the sealant layer 4 are simultaneously melt-extruded onto the metal layer 3. A sand lamination method may also be carried out in which the adhesive layer 5 is melt-extruded onto the metal layer 3, and the film-shaped sealant layer 4 is bonded thereto. When the sealant layer 4 is formed of two layers, for example, there is a method in which the adhesive layer 5 and one of the sealant layers 4 are co-extruded onto the metal layer 3, and the other of the sealant layers 4 is then bonded thereto by a thermal lamination method. There is also a method in which the adhesive layer 5 and one of the sealant layers 4 are co-extruded onto the metal layer 3, and the other of the film-shaped sealant layers 4 is bonded thereto. When the sealant layer 4 is made to have three or more layers, the sealant layer 4 can be formed using additionally a melt extrusion method, a thermal lamination method, a coating method or the like.

A laminate including the base material layer 1, the adhesive layer 2 provided as necessary, the metal layer 3, the surface of which is subjected to a chemical conversion treatment as necessary, the adhesive layer 5 provided as necessary and the sealant layer 4 in this order is formed in the manner described above. The laminate may be further subjected to a heating treatment by heat roll contact, hot air, application of near- or far-infrared rays, dielectric heating, thermal resistance heating or the like for enhancing the adhesion of the adhesive layer 2. As conditions for such a heating treatment, for example, the temperature is 150 to 250° C., and the time is 1 to 10 hours.

In the battery packaging material of the first aspect of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

5. Use of Battery Packaging Material of First Aspect of Invention

The battery packaging material of the first aspect of the present invention is used as a packaging material for hermetically sealing and storing battery elements such as a positive electrode, a negative electrode and an electrolyte.

Specifically, a battery element having at least a positive electrode, a negative electrode and an electrolyte is covered with the battery packaging material of the first aspect of the present invention in such a manner that a flange part (the region where the sealant layers contact each other) can be formed on the periphery of the battery element in the state that metal terminals connected respectively to the positive electrode and the negative electrode project outside. Next, sealant layers at the flange portion are heat-sealed to each other to hermetically seal the battery element, thereby providing a battery sealed with the battery packaging material of the first aspect of the present invention. When the battery element is stored using the battery packaging material of the first aspect of the present invention, the battery packaging material of the first aspect of the present invention is used such that the sealant layer 4 is on the inner side (surface in contact with the battery element).

While the battery packaging material of the first aspect of the present invention may be used for either a primary battery or a secondary battery, it is suited for use particularly in a secondary buttery. The type of secondary battery to which the battery packaging material of the first aspect of the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material of the first aspect of the present invention is applied include lithium ion batteries and lithium ion polymer batteries.

In the battery packaging material of the first aspect of the present invention, the sealing strength of a part that is heat-sealed with sealant layers 4 facing each other at 25° C. (heat-sealing conditions: 190° C., surface pressure 1.0 MPa, 3 seconds) is preferably 30 (N/15 mm) or more, more preferably 40 to 200 (N/15 mm). In the battery packaging material of the first aspect of the present invention, the sealing strength of a part that is heat-sealed with sealant layers 4 facing each other at 125° C. (heat-sealing conditions: 190° C., surface pressure 1.0 MPa, 3 seconds) is preferably 4 (N/15 mm) or more, more preferably 5 to 100 (N/15 mm). Further, the tensile yield strength (MD+TD) of the battery packaging material of the first aspect of the present invention is preferably 50 MPa or less, more preferably 35 MPa or less. When the tensile yield strength of the battery packaging material of the first aspect of the present invention is such a low value, the sealant layer 4 is soft, so that generation of cracks when the battery packaging material is stretched is more effectively suppressed, resulting in excellent moldability, and further, generation of cracks when the sealed-part is bent is more effectively suppressed, resulting in excellent insulation quality. That is, high flexibility can be imparted to the resin composition without substantially lowering the melting point of the resin composition. Accordingly, when the resin composition of the first aspect of the present invention is used in the sealant layer of the battery packaging material, the tensile yield strength (MD+TD) of the battery packaging material described later can be reduced, and therefore the effect of uniformizing the pressure applied during heat-sealing is enhanced, so that sealing can be made uniform, resulting in achievement of high sealing property. Further, in cooling of resin which occurs after heat-sealing, an effect of suppressing growth of crystal nuclei and an increase in the number of crystal nuclei in the resin composition is exhibited, so that an increase in the number of crystal nuclei after sealing and generation of fine cracks due to ununiformization can be prevented. Accordingly, sealing strength can be increased, and the permeability of an electrolytic solution as a content can be suppressed, so that stable sealing property is achieved. The tensile yield strength of the battery packaging material of the first aspect of the present invention is a value obtained by performing measurement using a method conforming to JIS K7161-1994.

6. Resin Composition of Second Aspect of Invention

The resin composition of the second aspect of the present invention is a resin composition to be used in a sealant layer of, for example, a battery packaging material as described later, the resin composition including a polyolefin-based resin having an isotactic fraction (mm) of 99% or less. The isotactic fraction (mm) of the polyolefin-based resin is a value obtained by performing measurement of a $^{13}C$ nuclear magnetic resonance spectrum.

At the time of sealing a battery element with a battery packaging material in a process for production of a battery, the battery packaging material may be molded with the heat-sealed part bent inward as described above. Here, cracks are generated at the heat-sealed part or a part in the vicinity thereof in the sealant layer, so that the insulation quality of the battery packaging material is easily deteriorated. Particularly, there is the problem that when the heat-sealed part is thinly formed (e.g., with a thickness of 40 μm or less), insulation quality is markedly deteriorated. On the other hand, by using the resin composition of the second aspect of the present invention in a sealant layer of a battery packaging material, deterioration of insulation quality when the heat-sealed part is bent can be effectively suppressed even when the sealant layer is thinly formed. The detailed mechanism in which by using the resin composition of the second aspect of the present invention in a sealant layer, insulation quality is improved even when the thickness of the sealant layer is small is not necessarily evident, but may be considered as follows. That is, the polyolefin-based resin contained in the resin composition of the second aspect of the present invention and having an isotactic fraction (mm) of 99% or less has low polymer chain stereoregularity, and low crystallinity. It is considered that accordingly, when the sealant layer includes a layer formed of the resin composition of the second aspect of the present invention, the sealant layer easily follows external stress applied when the heat-sealed part of the battery packaging material is bent, so that generation of cracks is suppressed, resulting in improvement of insulation quality.

The isotactic fraction (mm) of the polyolefin-based resin is not particularly limited as long as it is 99% or less, but it is preferably 90% or more, more preferably 93% or more, further preferably 95% or more because high insulation quality can be imparted to the battery packaging material even when the sealant layer is thinly formed.

The polyolefin-based resin contained in the resin composition of the second aspect of the present invention is not particularly limited as long as it satisfies the above-mentioned isotactic fraction. The polyolefin-based resin may be composed of one resin, or composed of two or more resins. The polyolefin-based resin can be formed from, for example, a polyolefin. The polyolefin is not particularly limited as long as it has the above-mentioned physical properties, and examples thereof include polyethylenes such as low-density polyethylene, medium-density polyethylene, high-density polyethylene and linear low-density polyethylene; crystalline or noncrystalline polypropylenes such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyolefins having at least propylene as a constituent monomer are preferred, and random copolymers of propylene-ethylene, terpolymers of propylene-ethylene-butene and homopolymers of propylene are further preferred, and random copolymers of propylene-ethylene are especially preferred, from the viewpoint of heat resistance. These polyolefins may be used alone, or may be used in combination of two or more thereof.

Examples of the resin other than a polyolefin as a resin that forms the polyolefin-based resin include acid-modified polyolefins. The acid-modified polyolefin is a polymer with polyolefin modified by, for example, subjecting the polyolefin to graft polymerization with an unsaturated carboxylic acid. Specific examples of the polyolefin to be acid-modified include polyethylenes such as low-density polyethylene, medium-density polyethylene, high-density polyethylene and linear low-density polyethylene; crystalline or noncrystalline polypropylenes such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyolefins having at least propylene as a constituent monomer are preferred, and terpolymers of ethylene-butene-propylene and random copolymers of propylene-ethylene are further preferred from the viewpoint of heat resistance. Examples of the unsaturated carboxylic acid to be used for modification include maleic acid, acrylic acid, itaconic acid, crotonic acid, maleic anhydride and itaconic anhydride. Among these unsaturated carboxylic acids, maleic acid and maleic anhydride are preferred. These acid-modified polyolefins may be used alone, or may be used in combination of two or more thereof.

For further improving insulation quality when the heat-sealed part of the battery packaging material is bent, the content of ethylene units in the polyolefin-based resin is preferably about 0.1 to 10 mol %, more preferably about 1 to 8 mol %, further preferably about 1 to 6 mol %. When the content of ethylene units in the polyolefin-based resin is in the above-mentioned range, the movability of molecular chains that form the polyolefin-based resin is improved, leading to improvement of flexibility. Accordingly, the sealant layer more easily follows external stress applied when the heat-sealed part of the battery packaging material is bent, so that generation of cracks is suppressed, resulting in further improvement of insulation quality. In the second aspect of the present invention, the content of ethylene units in the polyolefin-based resin is a value obtained by performing measurement of a $^{13}C$ nuclear magnetic resonance spectrum.

For further improving insulation quality when the heat-sealed part of the battery packaging material is bent, the content of components in the polyolefin-based resin, which are soluble in n-decane at 80° C., is preferably 0.1 to 15% by mass, more preferably 1 to 12% by mass, still more preferably 1 to 10% by mass. A polymer having lower stereoregularity tends to be more easily dissolved in n-decane, and therefore when the content of components in the polyolefin-based resin, which are soluble in n-decane at 80° C., is in the above-mentioned range, the movability of molecular chains that form the polyolefin-based resin may be improved, leading to improvement of flexibility. Accordingly, the sealant layer more easily follows external stress applied when the heat-sealed part of the battery packaging material is bent, so that generation of cracks is suppressed, resulting in further improvement of insulation quality. The content of components in the polyolefin-based resin, which are soluble in n-decane, is a value calculated from the content of the polyolefin-based resin which is not dissolved when 100 parts by mass of the polyolefin-based resin is stirred in 1000 parts by mass of n-decane at 80° C.

Physical properties of the polyolefin-based resin, such as the isotactic fraction, the content of ethylene units, and the content of components soluble in n-decane at 80° C., are determined by the molecular weight, the types and ratios of constituent monomers and so on, of the polyolefin-based resin. In the polyolefin-based resin, the molecular weight, the types and ratios of constituent monomers and so on, of the polyolefin-based resin are set so that at least the physical property: isotactic fraction (mm) of 99% or less is satisfied.

7. Battery Packaging Material of Second Aspect of Invention

The battery packaging material of the second aspect of the present invention includes a laminate including at least a base material layer 1, a metal layer 3 and a sealant layer 4 in this order. As shown in FIG. 1, the battery packaging material of the second aspect of the present invention may include an adhesive layer 2 between the base material layer 1 and the metal layer 3. When the battery packaging material of the second aspect of the present invention is used in a battery, the base material layer 1 is an outermost layer, and the sealant layer 4 is an innermost layer (battery element side). During construction of a battery, the sealant layers 4 situated on the peripheral edge of a battery element are brought into contact with each other, and heat-welded to hermetically seal the battery element, so that the battery element is encapsulated. As shown in FIG. 2, the battery packaging material of the second aspect of the present invention may include an adhesive layer 5 between the metal layer 3 and the sealant layer 4.

8. Compositions of Layers that Forms Battery Packaging Material of Second Aspect of Invention The base material layer 1, the adhesive layer 2 and the metal layer 3 in the second aspect of the present invention are the same as those in the second aspect of the present invention described above.

[Sealant Layer 4]

In the battery packaging material of the second aspect of the present invention, the sealant layer 4 corresponds to the innermost layer, and during assembly of a battery, the sealant layers 4 are heat-welded to each other to hermetically seal the battery element. In the second aspect of the present invention, the sealant layer 4 includes a layer formed of the resin composition of the second aspect of the present invention. The sealant layer 4 may be composed of one layer formed of the resin composition of the second aspect of the present invention, or may be composed of a plurality of layers formed of the resin composition. The sealant layer 4 may include one or more other layers that are not formed of the resin composition of the second aspect of the present invention, in addition to the layer(s) formed of the resin composition of the second aspect of the present invention. For example, the battery packaging material of the second aspect of the present invention may have a layer configuration in which the sealant layer 4 includes a first sealant layer situated on the metal layer 3 side and a second situated at the innermost in the sealant layer 4, the second sealant layer corresponds to the layer formed of the resin composition of the second aspect of the present invention, the first sealant layer corresponds to the other layer that is not formed of the resin composition of the second aspect of the present invention, or the battery packaging material of the second aspect of the present invention may have a layer configuration reverse thereto.

The layer formed of the resin composition of the second aspect of the present invention may contain a polyolefin-based resin having an isotactic fraction of more than 99%. The layer formed of the resin composition of the second aspect of the present invention may contain a resin other than a polyolefin-based resin.

When the layer formed of the resin composition of the second aspect of the present invention contains a polyolefin-based resin having an isotactic fraction of more than 99%, or a resin other than a polyolefin-based resin, the content of the polyolefin-based resin having an isotactic fraction of 99% or less in the layer is not particularly limited as long as the effect of the second aspect of the present invention is not hindered, but it is preferably 50% by mass or more. The layer formed of the resin composition of the second aspect of the present invention may be substantially formed of only a polyolefin-based resin having an isotactic fraction of 99% or less.

In the sealant layer 4, the melting point $T_{m1}$ of the layer formed of the resin composition of the second aspect of the present invention is not particularly limited, but it is preferably 100 to 160° C., more preferably 105 to 150° C., further preferably 110 to 140° C. for further improving insulation quality when the heat-sealed part of the battery packaging material is bent. The softening point $T_{s1}$ of the layer formed of the resin composition of the second aspect of the present invention is not particularly limited, but it is preferably 60 to 150° C., more preferably 65 to 140° C., further preferably 70 to 120° C. for the same reason as in the case of the melting point.

Here, the melting point $T_{m1}$ is a value obtained by measuring the melting point of the resin component, which forms the layer formed of the resin composition of the second aspect of the present invention, by a DSC method in accordance with JIS K6921-2 (ISO 1873-2.2:95). When this layer is formed of a blend resin containing a plurality of resin components, the melting point $T_{m1}$ thereof is determined in the following manner: the blend resin is subjected to a DSC method in accordance with JIS K6921-2 (ISO 1873-2.2:95), a ratio of a peak area of a melting point corresponding to each resin component is calculated with the total peak area set to 1, the melting point corresponding to each resin component is multiplied by the ratio of the peak area (melting point×area ratio), and the values (melting point×area ratio) thus calculated for the respective melting points are added together.

The above-mentioned softening point $T_{s1}$ is a value obtained by performing measurement in accordance with the Vicat softening temperature test method in JIS K7206. When this layer is formed of a blend resin containing a plurality of resin components, the softening point $T_{s1}$ thereof is determined by adding together the values of softening point× blending ratio of constituent components in the blend resin.

For forming the sealant layer 4 as thinly as possible while maintaining high insulation quality of the battery packaging material, the thickness of the layer formed of the resin composition of the second aspect of the present invention is, for example, 1 to 20 μm, preferably 3 to 18 μm, further preferably 5 to 15 μm.

The resin that forms the other layer which is not formed of the resin composition of the second aspect of the present invention and which is optionally provided is not particularly limited as long as the effect of the second aspect of the present invention is exhibited, and examples thereof include acid-modified polyolefins such as carboxylic acid-modified polyolefins and carboxylic acid-modified cyclic polyolefins, polyolefins, and cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene, and cyclic dienes such as cyclopentadiene, dicyclopentadiene, cyclohexadiene and norbornadiene. Among these polyolefins, cyclic alkenes are preferred, and norbornene is further preferred.

The carboxylic acid modified polyolefin is a polymer obtained by modifying a polyolefin with a carboxylic acid as described above. Examples of the carboxylic acid to be used for modification include maleic acid, acrylic acid, itaconic acid, crotonic acid, maleic anhydride and itaconic anhydride.

The carboxylic acid modified cyclic polyolefin is a polymer obtained by copolymerization while part of monomers constituting the cyclic polyolefin is replaced by α,β-unsaturated carboxylic acid or acid anhydride thereof, or by block copolymerization or graft copolymerization of α,β-unsaturated carboxylic acid or acid anhydride thereof with the cyclic polyolefin. The cyclic polyolefin to be modified with a carboxylic acid may be the same as the above-mentioned cyclic polyolefin. The carboxylic acid to be used for modification may be the same as that used for modification of the acid-modified cycloolefin copolymer.

Among these resin components, acid-modified polyolefins, crystalline or noncrystalline polyolefins, cyclic polyolefins, and blend polymers thereof are preferred, and polyethylene, polypropylene, copolymer of ethylene and norbornene, and blend polymer of two or more of these are more preferred.

The other layer may be formed from only one resin component, or may be formed from a blend polymer obtained by combining two or more resin components.

In the sealant layer 4, the melting point $T_{m2}$ of the other layer is not particularly limited, but it is preferably 100 to 160° C., more preferably 105 to 150° C., further preferably 110 to 140° C. for further improving insulation quality when the heat-sealed part of the battery packaging material is bent. The softening point $T_{s2}$ of the other layer is not particularly limited, but is preferably 60 to 150° C., more preferably 65 to 140° C., further preferably 75 to 120° C. for the same reason as in the case of the melting point.

The method for calculating the melting point $T_{m2}$ and the softening point $T_{s2}$ of the other layer is the same as the method for calculating the melting point $T_{m1}$ and the softening point $T_{s1}$ of the layer formed of the resin composition of the second aspect of the present invention.

(Total Thickness of Sealant Layer 4)

For forming the sealant layer 4 as thinly as possible while maintaining high insulation quality of the battery packaging material, the total thickness of the sealant layer 4 is preferably 40 μm or less, more preferably 20 to 40 μm.

[Adhesive Layer 5]

In the battery packaging material of the second aspect of the present invention, an adhesive layer 5 may be further provided between the metal layer 3 and the sealant layer 4 for the purpose of, for example, firmly bonding the metal layer 3 and the sealant layer 4.

The adhesive layer 5 is formed from an adhesive component capable of bonding the metal layer 3 and the sealant layer 4 described later. The adhesive used for forming the adhesive layer 5 may be a two-liquid curable adhesive, or may be a one-liquid curable adhesive. Further, the bonding mechanism of the adhesive component used for forming the adhesive layer 5 is not particularly limited, and examples thereof include bonding mechanisms of chemical reaction type, solvent volatilization type, heat melting type and heat pressing type.

Specific examples of the adhesive component that can be used for forming the adhesive layer 5 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or two or more adhesive components may be used in combination.

The thickness of the adhesive layer 5 is not particularly limited, but is preferably 0.01 μm or more, more preferably 0.05 to 20 μm.

9. Method for Producing Battery Packaging Material of Second Aspect of Invention The method for producing the battery packaging material of the second aspect of the present invention is the same as that in "4. Method for producing battery packaging material of first aspect of invention" as described above except that the resin composition of the second aspect of the present invention is used in place of the resin composition of the first aspect of the present invention.

10. Use of Battery Packaging Material of Second Aspect of Invention

The use of the battery packaging material of the second aspect of the present invention is the same as that in "5. Use of battery packaging material of first aspect of invention" as described above.

EXAMPLES

The first aspect and second aspect of the present invention will be described in detail below by way of examples and comparative examples. It is to be noted that the first aspect and second aspect of the present invention are not particularly limited to examples.

Examples 1A to 10A and Comparative Examples 1A to 6A of First Aspect of Invention

[Production of Battery Packaging Material]

A metal layer formed of an aluminum foil (thickness: 40 μm) subjected to a chemical conversion treatment at both surfaces was laminated on a base material layer formed of a biaxially stretched nylon film (thickness: 25 μm) using a dry lamination method. Specifically, a two-liquid urethane adhesive (polyester-based main agent and isocyanate-based curing agent) was applied to one surface of the aluminum foil, and an adhesive layer (thickness: 4 μm) was formed on the metal layer. The adhesive layer on the metal layer and the base material layer were then bonded to each other under pressure and heating, and an aging treatment was performed at 60° C. for 24 hours to prepare a laminate of base material layer/adhesive layer/metal layer. The chemical conversion treatment of the aluminum foil used as the metal layer was performed by applying to both the surfaces of the aluminum foil a treatment liquid including a phenol resin, a chromium fluoride compound and phosphoric acid using a roll coating method in such a manner that the application amount of chromium was 10 $mg/m^2$ (dry weight), and performing baking for 20 seconds under such conditions that the film temperature was 180° C. or higher.

An adhesive layer formed of a carboxylic acid-modified polypropylene resin and a sealant layer 4 formed of a resin as described in Table 1A were then laminated on the metal layer by a coextrusion method. Thus, a battery packaging material including a laminate with a base material layer, an adhesive layer, a metal layer and a sealant layer laminated in this order was obtained. Resins used in the sealant layer 4 include propylene-ethylene copolymers, propylene-based elastomers and low-stereoregular resins as described in Table 1. The product names of the low-stereoregular resins used in Examples A and Comparative Examples A are as follows.

Low-Stereoregular Olefin

Examples 3A, 5A and 10A and Comparative Example 6A: Product Name: "L-MODU S400" Manufactured by Idemitsu Kosan Co., Ltd Example 4A: Product Name: "L-MODU S901" Manufactured by Idemitsu Kosan Co., Ltd The melting point of each resin component is a value obtained by performing measurement using a differential scanning calorimeter (DSC). The melt flow rate (MFR) at 230° C. is a value obtained by performing measurement using a melt flow measurement device in accordance with JIS K7210. The weight average molecular weight is a value obtained by performing measurement by gel permeation chromatography (GPC) using polystyrene as a standard sample. The mesopentad fraction (mmmm) of the low-stereoregular olefin is a value obtained by performing measurement of a $^{13}C$ nuclear magnetic resonance spectrum.

The battery packaging material obtained in each of Examples 1A to 10A and Comparative Examples 1A to 6A was evaluated for the following items. The results are shown in Table 2A.

<Measurement of Tensile Yield Strength>

In accordance with JIS K7161-1994, a sample having a width of 15 mm and a length of 100 mm was provided, and the tensile yield strength was measured with the tension speed set to 300 mm/minute.

<Measurement of Sealing Strength>

(1) 25° C.

Battery packaging materials were placed one on another with the sealant layers facing each other, then heat-sealed at 190° C. and a surface pressure of 1.0 MPa for 3 seconds, and then left standing for 2 minutes at 25° C., the sealant layer at the heat-sealed part was delaminated over a length of 10 mm at a speed of 300 mm/minute at 25° C. using a tensile tester (AGS-50D (trade name) manufactured by Shimadzu Corporation), and the maximum strength at the time of delamination was defined as a sealing strength.

(2) 125° C.

Battery packaging materials were placed one on another with the sealant layers facing each other, then heat-sealed at 190° C. and a surface pressure of 1.0 MPa for 3 seconds, and then left standing for 2 minutes at 125° C., the sealant layer at the heat-sealed part was delaminated over a length of 10 mm at a speed of 300 mm/minute at 125° C. using a tensile tester (AGS-50D (trade name) manufactured by Shimadzu Corporation), and the maximum strength at the time of delamination was defined as sealing strength.

(3) Immersion in Electrolytic Solution

The battery packaging material was cut to a size of 150 mm (MD direction, longitudinal direction)×80 mm (TD direction, transverse direction), and folded back at the center in the MD direction to obtain a size of 75 mm×80 mm. Next, the battery packaging material was formed into a bag shape by heat-sealing the battery packaging material over a width of 7 mm on two sides in the MD direction in such a manner that the resulting bag had an inside size of 75 mm (MD direction)×65 mm (TD direction). Next, the bag was filled with 3 g of an electrolytic solution (composed of 1 M $LiPF_6$ and a mixed liquid of ethylene carbonate, diethyl carbonate and dimethyl carbonate (volume ratio: 1:1:1)) through an opening on one side which was not heat-sealed, and this side was then heat-sealed. As conditions for heat-sealing, the temperature was 190° C., the surface pressure was 1.0 MPa, and the time was 3 seconds. Next, the bag was left standing at 65° C. for 14 days with the latest heat-sealed side situated on the lowermost side. Next, the bag was left standing at room temperature until its temperature decreased to 25° C., and the sealant layer at the heat-sealed part was then delaminated over a length of 10 mm at a speed of 300 mm/minute at 25° C. using a tensile tester (AGS-50D (trade name) manufactured by Shimadzu Corporation), and the maximum strength at the time of delamination was defined as a sealing strength.

<Generation of Cracks in Stretching>

Each battery packaging material was cut to a size of 150 mm (MD direction)×80 mm (TD direction), and then cold-molded to a depth of 3.0 mm at 0.4 MPa using a mold (female mold) having an opening size of 35 mm×50 mm and a mold (male mold) corresponding thereto, so that a recess portion was formed at the central part of the battery packaging material. Thereafter, whether the recess portion was whitened or not was visually checked.

<Evaluation of Insulation Quality after Bending Sealed-Part>

The battery packaging material was cut to a sheet piece of 60 mm (MD direction)×60 mm (TD direction). Next, the sheet piece was folded in half in the MD direction, and heat-sealed at opposite sides to a width of 7 mm to prepare a pouch-type outer packaging having an opening at one side. Next, a lithium ion battery body including a cell was enclosed in the obtained outer packaging from the opened side in such a manner that a metal terminal was drawn to outside, an electrolytic solution was put in the outer packaging, and the opening was hermetically sealed to a width of 3 mm while the metal terminal was sandwiched, thereby preparing a lithium ion battery. As conditions for performing heat-sealing at this time, the surface pressure was 2.0 MPa, the sealing temperature was 170° C., and the sealing time was 5.0 seconds. Next, the heat-sealed part of the obtained lithium ion battery was bent inward, and restored. Next, a test for evaluation of insulation quality to cracks was then conducted using an impulse application system (lithium ion battery insulation tester manufactured by Nippon Technart Inc.). First, 10 each of the above-mentioned lithium ion batteries were prepared, and an impulse voltage at an application voltage of 100 V was applied between the negative electrode terminal and the aluminum foil of each lithium ion battery, and samples having a voltage drop of 40 V or less after 99 msec were determined as acceptable, and the set of batteries showing a percentage of acceptable products of 50% or higher was indicated by ○. The set of batteries showing a percentage of acceptable products of less than 50% was indicated by x.

TABLE 1A

| | Propylene-ethylene copolymer | | | | Propylene-based elastomer | | | Low-stereoregular olefin | | | |
|---|---|---|---|---|---|---|---|---|---|---|---|
| | Polymerization type | Proportion of ethylene (% by mass) | Melting point (° C.) | 230° C. MFR (g/10 minutes) | Content (% by mass) | Melting point (° C.) | 230° C. MFR (g/10 minutes) | Content (% by mass) | Melting point (° C.) | Weight average molecular weight | Content (% by mass) | Mesopentad fraction (%) |
| Example 1A | Random | 3 | 158 | 7 | 50 | 145 | 8 | 50 | — | — | — | — |
| Example 2A | Random | 2.5 | 159 | 7 | 80 | 160 | 30 | 20 | — | — | — | — |
| Example 3A | Random | 3 | 158 | 4 | 65 | 160 | 7 | 25 | 80 | 45,000 | 10 | 50 |
| Example 4A | Random | 5 | 157 | 7 | 65 | 160 | 7 | 30 | 80 | 120,000 | 5 | 40 |
| Example 5A | Random | 3 | 160 | 12 | 60 | 140 | 30 | 35 | 80 | 45,000 | 5 | 45 |
| Example 6A | Block | 5 | 161 | 2 | 50 | 145 | 30 | 50 | — | — | — | — |
| Example 7A | Block | 5 | 161 | 2 | 50 | 160 | 7 | 50 | — | — | — | — |
| Example 8A | Block | 2 | 162 | 4 | 72 | 160 | 30 | 28 | — | — | — | — |
| Example 9A | Block | 2 | 162 | 2 | 50 | 138 | 7 | 50 | — | — | — | — |
| Example 10A | Block | 7 | 159 | 9 | 60 | 160 | 7 | 35 | 80 | 45,000 | 5 | 70 |
| Comparative Example 1A | Polyethylene | 100 | 120 | 7 | 100 | — | — | — | — | — | — | — |
| Comparative Example 2A | Random | 3 | 158 | 7 | 100 | — | — | — | — | — | — | — |
| Comparative Example 3A | Random | 8 | 132 | 7 | 100 | — | — | — | — | — | — | — |
| Comparative Example 4A | Block | 5 | 161 | 2 | 100 | — | — | — | — | — | — | — |
| Comparative Example 5A | Random | 3 | 158 | 7 | 50 | 80 | 25 | 50 | — | — | — | — |

TABLE 1A-continued

| | Propylene-ethylene copolymer | | | | | Propylene-based elastomer | | | Low-stereoregular olefin | | | |
|---|---|---|---|---|---|---|---|---|---|---|---|---|
| | Polymerization type | Proportion of ethylene (% by mass) | Melting point (° C.) | 230° C. MFR (g/10 minutes) | Content (% by mass) | Melting point (° C.) | 230° C. MFR (g/10 minutes) | Content (% by mass) | Melting point (° C.) | Weight average molecular weight | Content (% by mass) | Mesopentad fraction (%) |
| Comparative Example 6A | Random | 8 | 132 | 7 | 65 | 140 | 30 | 25 | 80 | 45,000 | 10 | 50 |

TABLE 2A

| | Tensile yield strength | Sealing strength (N/15 mm) | | | Cracks in stretching | Evaluation of insulation quality |
|---|---|---|---|---|---|---|
| | (MD + TD) (Mpa) | 25° C. | 125° C. | Electrolytic solution | Visual observation | after bending sealed-part |
| Example 1A | 35 | 83 | 25 | 78 | Absent | ○ |
| Example 2A | 37 | 78 | 20 | 70 | Absent | ○ |
| Example 3A | 25 | 100 | 30 | 94 | Absent | ○ |
| Example 4A | 30 | 92 | 32 | 90 | Absent | ○ |
| Example 5A | 30 | 90 | 25 | 85 | Absent | ○ |
| Example 6A | 35 | 85 | 30 | 85 | Absent | ○ |
| Example 7A | 42 | 75 | 40 | 72 | Absent | ○ |
| Example 8A | 48 | 72 | 50 | 42 | Absent | ○ |
| Example 9A | 45 | 73 | 45 | 69 | Absent | ○ |
| Example 10A | 30 | 90 | 40 | 85 | Absent | ○ |
| Comparative Example 1A | 35 | 60 | 10 | 5 | Absent | ○ |
| Comparative Example 2A | 55 | 71 | 15 | 65 | Present | x |
| Comparative Example 3A | 40 | 72 | 15 | 70 | Present | x |
| Comparative Example 4A | 60 | 70 | 25 | 65 | Present | ○ |
| Comparative Example 5A | 55 | 65 | 10 | 30 | Present | x |
| Comparative Example 6A | 40 | 65 | 15 | 60 | Absent | ○ |

As shown in Tables 1A and 2A, the battery packaging materials of Examples 1A and 2A in which a propylene-ethylene random copolymer having a melting point of 156° C. or higher and an ethylene content of 5% by mass or less, and a polypropylene-based elastomer having a melting point of 135° C. or higher were used in the sealant layer had low tensile yield strength and high sealing strength when the battery packaging material was exposed to a temperature of 25° C., a temperature of 125° C. and an electrolytic solution. Further, the battery packaging materials of Examples 1A and 2A did not have cracks in stretching, and had high insulation quality after the sealed part was bent. The battery packaging materials of Examples 3A to 5A in which a low-stereoregular olefin was further added to the sealant layer had further low tensile yield strength and very high sealing strength.

The battery packaging materials of Examples 6A to 9A in which a propylene-ethylene block copolymer having a melting point of 158° C. or higher and an ethylene content of 7% by mass or less, and a polypropylene-based elastomer having a melting point of 135° C. or higher were used in the sealant layer also had low tensile yield strength and high sealing strength when the battery packaging material was exposed to a temperature of 25° C., a temperature of 125° C. and an electrolytic solution. Further, the battery packaging materials of Examples 6A to 9A did not have cracks in stretching, and had high insulation quality after the sealed part was bent. The battery packaging material of Example 10A in which a low-stereoregular olefin was further added to the sealant layer had further low tensile yield strength and very high sealing strength.

On the other hand, the battery packaging material of Comparative Example 1A in which the sealant layer was formed of polyethylene had low tensile yield strength, but tended to have low sealing strength at 125° C., and had markedly low sealing strength after the battery packaging material was exposed to an electrolytic solution. The battery packaging materials of Comparative Examples 2A and 3A in which a propylene-ethylene random copolymer having a melting point of 156° C. or higher and an ethylene content of 5% by mass or less was used, but a polypropylene-based elastomer having a melting point of 135° C. or higher was not used in the sealant layer had low insulation quality after the sealed part was bent. The battery packaging materials of Comparative Examples 2A and 3A tended to have low sealing strength at 125° C., and had cracks in stretching. The battery packaging material of Comparative Example 5A in which a propylene-ethylene random copolymer having a melting point of 156° C. or higher and an ethylene content of 5% by mass or less was used, and a polypropylene-based elastomer having a melting point of 80° C. was used in the sealant layer had low sealing strength after the battery packaging material was exposed to an electrolytic solution. In this battery packaging material, the electrolytic solution was discolored, and the added polypropylene elastomer was dissolved. Further, the battery packaging material of Comparative Example 5A had cracks in stretching, and had poor insulation quality after the sealed part was bent.

The battery packaging material of Comparative Example 4A in which a propylene-ethylene block copolymer having a melting point of 158° C. or higher and an ethylene content of 7% by mass or less was used, but a polypropylene-based elastomer having a melting point of 135° C. or higher was not used had very high tensile yield strength, and had cracks in stretching. The battery packaging material of Comparative Example 6A in which a polypropylene-based elastomer having a melting point of 135° C. or higher, and a low-stereoregular olefin having a mesopentad fraction (mmmm) of 90% or less were used, and a propylene-ethylene random copolymer having a melting point of 132° C. and an ethylene content of 8% by mass was used had low tensile yield strength, but had low sealing strength at 125° C.

Examples 1B to 16B and Comparative Examples 1B to 4B of Second Aspect of Invention

[Production of Battery Packaging Material]

A metal layer formed of an aluminum foil (thickness: 40 μm) subjected to a chemical conversion treatment at both surfaces was laminated on a base material layer formed of a biaxially stretched nylon film (thickness: 25 μm) using a dry lamination method. Specifically, a two-liquid urethane adhesive (polyester-based main agent and isocyanate-based curing agent) was applied to one surface of the aluminum foil, and an adhesive layer (thickness: 4 μm) was formed on the metal layer. The adhesive layer on the metal layer and the base material layer were then bonded to each other under pressure and heating, and an aging treatment was performed at 60° C. for 24 hours to prepare a laminate of base material layer/adhesive layer/metal layer. The chemical conversion treatment of the aluminum foil used as the metal layer was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher.

A resin for forming a first sealant layer and a resin for forming a second sealant layer were then co-extruded in a molten state onto the laminate on the metal layer side to laminate the first sealant layer and the second sealant layer on the metal layer 3. The resin for forming each sealant layer, the thickness and the melting point are as shown in Table 1B. The content (mol %) of ethylene units, the isotactic fraction (%) and the content (% by mass) of components soluble in n-decane for the resin for forming the second sealant layer are as shown in Table 1B. Thus, a battery packaging material including a laminate with a base material layer 1, an adhesive layer 2, a metal layer 3, a first sealant layer 4a and a second sealant layer 4b laminated in this order was obtained.

The melting point of each resin is a value obtained by performing measurement using a differential scanning calorimeter (DSC). The content of ethylene units and the isotactic fraction (mm) are values obtained by performing measurement of a $^{13}C$ nuclear magnetic resonance spectrum. The content of components in the resin, which were soluble in n-decane was calculated from the content of the resin which was not dissolved when 100 parts by mass of the resin was stirred in 1000 parts by mass of n-decane at 80° C.

Next, for the battery packaging material obtained in each of Examples 1B to 16B and Comparative Examples 1B to 4B, insulation quality after bending the sealed part was evaluated in the following manner.

<Evaluation of Insulation Quality after Bending Sealed Part Once>

The battery packaging material was cut to a sheet piece of 60 mm (MD direction)×60 mm (TD direction). Next, the sheet piece was folded in half in the MD direction, and heat-sealed at opposite sides to a width of 7 mm to prepare a pouch-type outer packaging having an opening at one side. Next, a lithium ion battery body including a cell was enclosed in the obtained outer packaging from the opened side in such a manner that a metal terminal was drawn to outside, an electrolytic solution was put in the outer packaging, and the opening was hermetically sealed to a width of 3 mm while the metal terminal was sandwiched, thereby preparing a lithium ion battery. As conditions for performing heat-sealing at this time, the surface pressure was 2.0 MPa, the sealing temperature was 170° C., and the sealing time was 5.0 seconds. Next, the heat-sealed part of the obtained lithium ion battery was bent inward, and restored. Next, a test for evaluation of insulation quality to cracks was then conducted using an impulse application system (lithium ion battery insulation tester manufactured by Nippon Technart Inc.). First, 20 lithium ion batteries as described above were provided, an impulse voltage of 100 V was applied between a negative electrode terminal of each lithium ion battery and an aluminum foil, and samples having a voltage drop of 20 V or less after 99 msec were determined as acceptable. The percentages of passed products are shown in Table 1B.

TABLE 1B

| | First sealant layer | | | Second sealant layer | | | | | | Evaluation of insulation quality after bending sealed part once (Percentage of passed products) |
|---|---|---|---|---|---|---|---|---|---|---|
| | Resin | Melting point (° C.) | Thickness (μm) | Resin | Melting point (° C.) | Thickness (μm) | Content of ethylene units (mol %) | Isotactic fraction (%) | Content of components soluble in n-decane (% by mass) | |
| Example 1B | PPa(1) | 160 | 15 | PP(1) | 150 | 15 | 1 | 95 | 5 | 90% |
| Example 2B | PPa(1) | 160 | 15 | PP(1) | 150 | 8 | 1 | 95 | 5 | 80% |
| Example 3B | PPa(1) | 160 | 15 | PP(2) | 155 | 15 | 1 | 99 | 5 | 85% |
| Example 4B | PPa(1) | 160 | 15 | PP(2) | 155 | 8 | 1 | 99 | 5 | 80% |
| Example 5B | PPa(1) | 160 | 15 | PP(3) | 140 | 15 | 6 | 95 | 5 | 95% |
| Example 6B | PPa(1) | 160 | 15 | PP(3) | 140 | 8 | 6 | 95 | 5 | 80% |
| Example 7B | PPa(1) | 160 | 15 | PP(4) | 145 | 15 | 6 | 99 | 5 | 80% |
| Example 8B | PPa(1) | 160 | 15 | PP(4) | 145 | 8 | 6 | 99 | 5 | 75% |
| Example 9B | PPa(2) | 140 | 15 | PP(5) | 150 | 15 | 3 | 95 | 1 | 90% |
| Example 10B | PPa(2) | 140 | 15 | PP(5) | 150 | 8 | 3 | 95 | 1 | 80% |

TABLE 1B-continued

|  | First sealant layer | | | Second sealant layer | | | | | Evaluation of insulation quality after bending |
|---|---|---|---|---|---|---|---|---|---|
|  | Resin | Melting point (° C.) | Thickness (μm) | Resin | Melting point (° C.) | Thickness (μm) | Content of ethylene units (mol %) | Isotactic fraction (%) | Content of components soluble in n-decane (% by mass) | sealed part once (Percentage of passed products) |
| Example 11B | PPa(2) | 140 | 15 | PP(6) | 155 | 15 | 3 | 99 | 1 | 80% |
| Example 12B | PPa(2) | 140 | 15 | PP(6) | 155 | 8 | 3 | 99 | 1 | 75% |
| Example 13B | PPa(2) | 140 | 15 | PP(7) | 130 | 15 | 3 | 95 | 10 | 90% |
| Example 14B | PPa(2) | 140 | 15 | PP(7) | 130 | 8 | 3 | 95 | 10 | 85% |
| Example 15B | PPa(2) | 140 | 15 | PP(8) | 135 | 15 | 3 | 99 | 10 | 85% |
| Example 16B | PPa(2) | 140 | 15 | PP(8) | 135 | 8 | 3 | 99 | 10 | 75% |
| Comparative Example 1B | PPa(1) | 160 | 15 | PP(9) | 156 | 15 | 1 | 99.5 | 5 | 20% |
| Comparative Example 2B | PPa(1) | 160 | 15 | PP(10) | 141 | 15 | 6 | 99.5 | 5 | 40% |
| Comparative Example 3B | PPa(1) | 160 | 15 | PP(11) | 157 | 15 | 3 | 99.5 | 1 | 10% |
| Comparative Example 4B | PPa(1) | 160 | 15 | PP(12) | 138 | 15 | 3 | 99.5 | 10 | 25% |

Note: Column headers for the second sealant layer numeric columns are (left to right): Melting point, Thickness, ethylene units, Isotactic fraction, soluble in n-decane.

The resins described in Table 1B are as listed below.
PPa(1): acid-modified random polypropylene (melting point: 160° C.)
PPa(2): acid-modified random polypropylene (melting point: 140° C.)
PP(1): random polypropylene (melting point: 150° C.)
PP(2): random polypropylene (melting point: 155° C.)
PP(3): random polypropylene (melting point: 140° C.)
PP(4): random polypropylene (melting point: 145° C.)
PP(5): random polypropylene (melting point: 150° C.)
PP(6): random polypropylene (melting point: 155° C.)
PP(7): random polypropylene (melting point: 130° C.)
PP(8): random polypropylene (melting point: 135° C.)
PP(9): random polypropylene (melting point: 156° C.)
PP(10): random polypropylene (melting point: 141° C.)
PP(11): random polypropylene (melting point: 157° C.)
PP(12): random polypropylene (melting point: 138° C.)

As shown in Table 1B, in all of the battery packaging materials of Examples 1B to 16B produced using random polypropylene having an isotactic fraction (mm) of 99% or less, the percentage of passed products was high, i.e., 75% or more, in evaluation of insulation quality after bending the sealed part once. On the other hand, in all of the battery packaging materials of Comparative Examples 1B to 4B having an isotactic fraction (mm) of 99.5%, the percentage of passed products was very low in evaluation of insulation quality after bending the sealed part once.

DESCRIPTION OF REFERENCE SIGNS

1 Base material layer
2 Adhesive layer
3 Metal layer
4 Sealant layer
5 Adhesive layer

The invention claimed is:

1. A resin film for a sealant layer of a battery packaging material, the resin film being formed of a resin composition comprising a polyolefin-based resin having (i) an isotactic fraction (mm) in the range of 90% to 95%, and (ii) a melting point in the range of from 110 to 160° C., wherein the resin film has a thickness of 40 μm or less.

2. The resin film according to claim 1, wherein the polyolefin-based resin has an ethylene unit content of 0.1 to 10 mol %.

3. The resin film according to claim 1, wherein in the polyolefin-based resin, an amount of components soluble in n-decane at 80° C. is 0.1 to 15% by mass.

4. The resin film according to claim 1, wherein the polyolefin-based resin includes at least propylene as a constituent monomer.

5. A battery packaging material comprising a laminate in which at least a base material layer, a metal layer and a sealant layer are laminated in this order, wherein:
the sealant layer includes a layer formed of a resin composition comprising a polyolefin-based resin having an isotactic fraction (mm) in the range of 90% to 95%, and
a melting point $T_{m1}$ of the layer formed of the resin composition is in the range of from 100 to 160° C.

6. The battery packaging material according to claim 5, wherein the layer formed of the resin composition has a thickness of 1 to 20 μm.

7. The battery packaging material according to claim 5, wherein the sealant layer has a thickness of 40 μm or less.

8. A battery, wherein a battery element including a positive electrode, a negative electrode and an electrolyte is sealed in the battery packaging material according to claim 5.

9. The resin film according to claim 1, wherein in the polyolefin-based resin, an amount of components soluble in n-decane at 80° C. is 0.1 to 5% by mass.

10. The battery packaging material according to claim 5, wherein in the polyolefin-based resin, an amount of components soluble in n-decane at 80° C. is 0.1 to 5% by mass.

11. The resin film according to claim 1, having a thickness of 1 to 20 μm.

* * * * *